(12) United States Patent
Weiss et al.

(10) Patent No.: US 8,453,051 B1
(45) Date of Patent: May 28, 2013

(54) DYNAMIC DISPLAY DEPENDENT MARKUP LANGUAGE INTERFACE

(75) Inventors: Steven K. Weiss, Foster City, CA (US); Craig S. Griffin, Campbell, CA (US); John Lattyak, Los Gatos, CA (US); Lawrence Arnold Lynch-Freshner, Boulder Creek, CA (US); Thomas A. Ryan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1246 days.

(21) Appl. No.: 12/060,167

(22) Filed: Mar. 31, 2008

(51) Int. Cl.
*G06F 15/16* (2006.01)

(52) U.S. Cl.
USPC .............. 715/240; 715/234; 715/241

(58) Field of Classification Search
USPC .......... 715/200, 234, 238, 240, 241
See application file for complete search history.

(56) References Cited

U.S. PATENT DOCUMENTS

| | | | |
|---|---|---|---|
| 5,455,945 A | 10/1995 | VanderDrift | |
| 5,566,098 A | 10/1996 | Lucente et al. | |
| 5,631,984 A | 5/1997 | Graf et al. | |
| 5,663,748 A | 9/1997 | Huffman et al. | |
| 5,745,360 A | 4/1998 | Leone et al. | |
| 5,799,157 A | 8/1998 | Escallon | |
| 5,847,698 A | 12/1998 | Reavey et al. | |
| 5,937,158 A * | 8/1999 | Uranaka | 726/4 |
| 6,082,776 A | 7/2000 | Feinberg | |
| 6,289,510 B1 * | 9/2001 | Nakajima | 717/170 |
| 6,633,877 B1 | 10/2003 | Saigh et al. | |
| 6,697,948 B1 | 2/2004 | Rabin et al. | |
| 6,990,489 B2 * | 1/2006 | Kondo et al. | 1/1 |
| 7,009,596 B2 | 3/2006 | Seet et al. | |
| 7,298,851 B1 | 11/2007 | Hendricks et al. | |
| 7,304,635 B2 | 12/2007 | Seet et al. | |
| 7,886,226 B1 | 2/2011 | McCoy et al. | |
| 7,925,990 B2 | 4/2011 | Bedingfield, Sr. | |
| 2001/0049635 A1 | 12/2001 | Chung | |
| 2002/0034296 A1 | 3/2002 | Yoshimune et al. | |
| 2002/0035697 A1 | 3/2002 | McCurdy et al. | |
| 2002/0077985 A1 | 6/2002 | Kobata et al. | |
| 2002/0090934 A1 | 7/2002 | Mitchelmore | |
| 2002/0095538 A1 * | 7/2002 | Marshall | 710/74 |
| 2002/0099763 A1 * | 7/2002 | Kondo et al. | 709/201 |
| 2002/0133464 A1 | 9/2002 | Ress et al. | |
| 2002/0138520 A1 | 9/2002 | Wakai et al. | |
| 2002/0152257 A1 | 10/2002 | Frolik et al. | |
| 2002/0169700 A1 | 11/2002 | Huffman et al. | |
| 2003/0018663 A1 | 1/2003 | Cornette et al. | |

(Continued)

OTHER PUBLICATIONS

Office action for U.S. Appl. No. 12/060,114, mailed on Aug. 10, 2011, Ryan et al., "Dynamically Populating Electronic Item", 32 pages.

(Continued)

*Primary Examiner* — Stephen Hong
*Assistant Examiner* — Gregory J Vaughn
(74) *Attorney, Agent, or Firm* — Lee & Hayes, PLLC

(57) ABSTRACT

Tools and techniques for creating presentations via dynamic digital content (DDC) tools using a display dependent markup language interface facilitating dynamic content are described. The markup language, "DXyml", identifies content elements, including dynamic content elements, for display and specifies pixel locations at which to position the content elements on a client device. Pixel locations are selected for particular screen configurations, allowing the presentations to be created in advance of being served to specific types of devices with the particular screen configurations.

21 Claims, 7 Drawing Sheets

U.S. PATENT DOCUMENTS

| | | |
|---|---|---|
| 2003/0093336 A1 | 5/2003 | Ukita et al. |
| 2003/0149618 A1 | 8/2003 | Sender et al. |
| 2003/0182231 A1* | 9/2003 | Koike et al. ............... 705/51 |
| 2003/0236917 A1 | 12/2003 | Gibbs et al. |
| 2004/0001087 A1 | 1/2004 | Warmus et al. |
| 2004/0098284 A1 | 5/2004 | Petito et al. |
| 2004/0139400 A1 | 7/2004 | Allam et al. |
| 2004/0140975 A1* | 7/2004 | Saito et al. ............... 345/418 |
| 2004/0153422 A1* | 8/2004 | Sakamura et al. ........... 705/76 |
| 2004/0254851 A1 | 12/2004 | Himeno et al. |
| 2005/0012723 A1 | 1/2005 | Pallakoff |
| 2005/0138139 A1 | 6/2005 | Jain et al. |
| 2005/0246451 A1 | 11/2005 | Silverman et al. |
| 2006/0015508 A1* | 1/2006 | Kondo et al. ............... 707/10 |
| 2006/0036488 A1 | 2/2006 | Golan et al. |
| 2006/0050996 A1 | 3/2006 | King et al. |
| 2006/0184566 A1 | 8/2006 | Lo et al. |
| 2006/0281058 A1 | 12/2006 | Mangoaela |
| 2007/0005616 A1* | 1/2007 | Hay et al. ............... 707/100 |
| 2007/0027887 A1 | 2/2007 | Baldwin |
| 2007/0053246 A1 | 3/2007 | Sano et al. |
| 2007/0074109 A1 | 3/2007 | Nagahara et al. |
| 2007/0118556 A1 | 5/2007 | Arnold et al. |
| 2007/0118606 A1 | 5/2007 | Duncan et al. |
| 2007/0124781 A1 | 5/2007 | Casey et al. |
| 2007/0136337 A1 | 6/2007 | Sah et al. |
| 2007/0154876 A1* | 7/2007 | Harrison ............... 434/365 |
| 2007/0201093 A1 | 8/2007 | Johnson et al. |
| 2008/0005263 A1 | 1/2008 | Baraev et al. |
| 2008/0007486 A1 | 1/2008 | Fujinawa et al. |
| 2008/0015933 A1 | 1/2008 | McKenna et al. |
| 2008/0071561 A1 | 3/2008 | Holcombe |
| 2008/0091796 A1 | 4/2008 | Story et al. |
| 2008/0180401 A1 | 7/2008 | Khedouri et al. |
| 2008/0183541 A1 | 7/2008 | Wenger et al. |
| 2008/0189608 A1 | 8/2008 | Nurmi |
| 2009/0064184 A1 | 3/2009 | Chacko et al. |
| 2009/0094018 A1 | 4/2009 | Hu et al. |
| 2009/0187846 A1 | 7/2009 | Paasovaara |

OTHER PUBLICATIONS

Final Office Action for U.S. Appl. No. 12/060,114, mailed on Jan. 19, 2012, Thomas A. Ryan et al., "Dynamically Populating Electronic Item", 73 pages.

Final Office Action for U.S. Appl. No. 12/060,167, mailed on Aug. 17, 2012, Steven K. Weiss et al., "Dynamic Display Dependent Markup Language Interface", 11 pages.

PCT Search Report mailed Aug. 12, 2011 for PCT application No. PCT/US11/35853, 8 pages.

* cited by examiner

DYNAMIC DISPLAY DEPENDENT MARKUP LANGUAGE INTERFACE

BACKGROUND

Large, coherent units of information made up of digital content representing electronic books, electronic images, and other presentations are relatively effortless to distribute today using computers, networks, handheld devices, and other electronic technologies. Books distributed using electronic technologies are commonly referred to as electronic books or "eBooks." More generally, items distributed using electronic technologies are commonly referred to as electronic items.

Typically, electronic items are structured as virtual frames presented on a computing device. In the context of the Internet, content is arranged and delivered as "web pages" created using a markup language such as html (Hypertext Markup Language) that describes the structure of the content on the page, and provides instructions to the browser regarding how to render the content. Html provides a means to describe the structure of text-based information in a document—by denoting certain text as headings, paragraphs, lists, and so on—and to supplement that text with interactive forms, embedded images, and other objects.

One problem today is that digital content may be displayed and read on a variety of different computing devices (e.g., computer monitors, portable digital assistants (PDAs), pocket computers, specialized eBook reader devices, etc.), with an assortment of different display conditions (e.g., screen size and resolution, font type and size, margins, line spacing, etc.). Web pages can be designed with instructions to assist in the rendering of the content on different devices. But, since the display conditions vary widely, html simply attempts to render the content in the best way it can. In some cases, content flows off the bottom of the screen or to the right of the screen. However, scrolling to off-screen content may take an unacceptable amount of time from a user experience perspective for users of a growing number of devices employing displays atypical of general computing displays, such as electronic paper display technology. An electronic paper display is a display that has a high resolution (generally 150 dpi or better) and is bi-stable, meaning that it is capable of holding text or other rendered images even when very little or no power is supplied to the display. One shortcoming of such displays is a comparatively slow refresh rate.

Additionally, less content is available for these displays, and much of the content available is fixed or static. For example, no matter how many times one reads a book, the content will be the same. Facilitating creating a greater variety of electronic items designed for these displays would be a welcome advancement.

Thus, with the growing number of devices employing less typical displays, and because conventional digital content for these devices is static, third party vendors and consumers desire the ability to publish and/or create their own content for various of these devices. Accordingly, there remains a need to improve the way dynamic digital content is delivered to and rendered on devices with different display characteristics.

BRIEF DESCRIPTION OF THE DRAWINGS

The detailed description is discussed with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
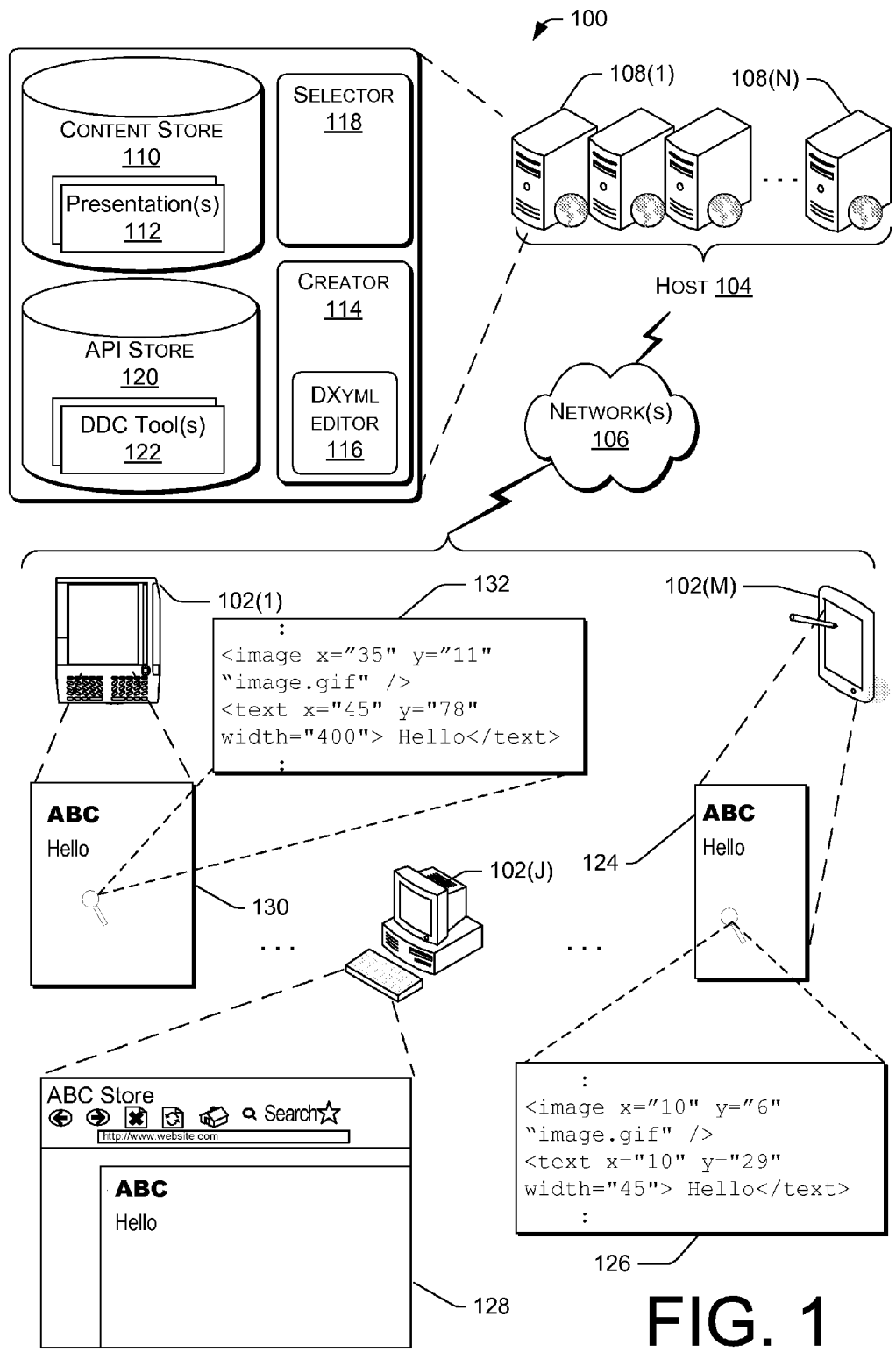
FIG. 1 illustrates an example architecture in which dynamic content created using a dynamic display dependent markup language can be stored and served upon request to client devices with different display characteristics.

This disclosure made in terms of a specific context, (e.g. an eBook reader), but is applicable to other types of electronic devices, (e.g., computers, PDAs, etc). This disclosure is directed to one or more tools that facilitate development of dynamic digital content to be rendered on a client device with a particular screen configuration. The dynamic digital content (DDC) tools facilitate development of applications for structured presentation via a particular dynamic markup language (DXyml). The DDC tools and the DXyml markup language enable dynamic digital content designers to specify precise two-dimensional locations at which to position digital content including dynamic elements of the digital content onto a display with a particular screen configuration.

The DDC tools which are described herein may be implemented independently or as a part of a schema via a scripting language thereby allowing developers to create content designed for devices with a particular screen configuration. In an aspect of at least one embodiment, such content may include interactive content such as games, for example word games like word-search, crossword puzzles, and Scrabble™. Additionally, the interactive content may include number games, such as Sudoku and Kakuro. As another alternative, the content may include dynamic content, for example stocktickers, sports scores, time, temperature, etc.

The DXyml markup language specifies an x-coordinate and a y-coordinate for at least each dynamic content element so that at least the dynamic content element can be placed on a unique pixel of a particular screen configuration.

Dynamic content elements may be populated from one or more sources including remote sources, removable sources, and internal sources. Additionally, each of the sources of dynamic content elements may include specialized data stores of dynamic content. As such, the dynamic markup language is referred to as "DXyml" as it includes instructions to identify "x" and "y" coordinates of a dynamic element, and also uses tags, delimiters, instructions, and other features of a markup language. By coding in a scripting language, developers can access the DDC tools to write applications that utilize DXyml, thereby optimizing the applications for particular platforms having particular screen configurations. As such, the dynamic markup language is referred to as "DXyml" as it includes instructions to identify "x" and "y" coordinates of a dynamic element, and also uses tags, delimiters, instructions, and/or other features of a markup language. By coding in a scripting language, developers may access the DDC tools to write applications that utilize DXyml, thereby optimizing the applications for particular platforms having particular screen configurations.

In an aspect of at least one embodiment, the content may include information about the client device with a particular screen configuration on which the content is running. Such information may include:

- information about the client device such as system information (e.g., the operating system version, the device serial number, the device name, and the device model, etc.),
- information generated by the client device (e.g., location, wireless connection status, memory status, storage status, and profile information of a user, etc.), and/or
- tools information comprising an array of objects representing each tool and including at least the version number of that tool for the client device.

In an aspect of at least one embodiment, dynamic data may be written to a disk, causing it to be stored on-board the device. Additionally, data may be synchronized to a server although the DDC tools may not be running. Furthermore, data may be synchronized to a server although the corresponding dynamic element may not be active. Moreover, previously synchronized data may be maintained in a cache which may facilitate presentation on a device in an event that the device is unable to synchronize. In addition, the DDC tools facilitate dynamic queries. Furthermore, the DDC tools may facilitate creation of content like dynamically populated electronic items. For example, DDC tools may be operated on an eBook reader. Additionally, the DDC tool may implement application programming interface (API) hooks into an eBook type reader facilitating delivery of system information (e.g., remaining battery life, LAN module status, services currently available, and GPS coordinates of the nearest cellular tower, etc.). Moreover, a DDC tool may facilitate definition of alternate presentation pages within an application such as alternate sheets of electronic paper where dynamic data is dynamically synchronized to a server on a sheet that is not visible at a particular time, although another sheet in the application is visible on the device at the particular time.

Additional details of dynamically populating electronic items can be found in copending U.S. patent application Ser. No. 12/060,114, filed concurrently with the instant application, and entitled "DYNAMICALLY POPULATING ELECTRONIC ITEMS."

Among other features, content written in the DXyml markup language does not need to be executed in a particular order (as a conventional browser might execute html) because the layout is defined before the content is served. In certain implementations, text elements and other non-image elements can be rendered first on the display, followed subsequently by rendering image elements. Further, more than one screen's worth of content may be provided in batch to the devices to allow a user to navigate through multiple screens before seeking additional content. The next batch of content may be fetched automatically in advance of the user requesting the additional content. In this way, any latency of downloading the content to the client device can be masked by the pre-fetching of additional content based on what the user is likely to request next.

The techniques described herein may be implemented in a number of ways. Example implementations are provided below with reference to the following figures.

Illustrative System Architecture

FIG. 1 illustrates an example architecture 100 in which a dynamic digital content (DDC) tool facilitates presentation of content, for example in the form of pages, sheets, interactive content, dynamic content, and dynamic elements created using a dynamic display dependent markup language (such as DXyml) for storage, updating, and retrieval by client devices with different display characteristics. In architecture 100, client computing devices 102(1), . . . , 102(J), . . . , 102(M) access a host 104 via a network 106. The network 106 is representative of many different types of networks, such as cable networks, the Internet, local area networks, wide area networks and wireless networks, or a combination of such networks. The network 106 may include wire-based and/or wireless technologies.

The host 104 is implemented on one or more servers 108(1), . . . , 108(N). Many different server architectures may be used to implement the host 104, including arranging the servers 108 as a server farm. The host 104 is capable of handling requests from many user computing devices 102 and serving, in response, various information and data to the user computing devices. In certain implementations, the host 104 is representative of a website that receives requests from the computing devices 102, and returns pages responsive to the requests.

The client devices 102 (or simply "clients") may be implemented in any number of ways. In FIG. 1, the devices are illustrated as a handheld electronic book (eBook) reader device 102(1), a personal computer 102(J), and a portable digital assistant (PDA) 102(M). Other example client implementations include portable computing devices (e.g., laptop computers, tablet computers, etc.), communication devices (e.g., cellular phones, smart phones, etc.), entertainment devices (e.g., television set-top boxes, game consoles, portable gaming devices, digital video recorders, etc.), and other electronic devices capable of rendering and depicting content.

Developers employ a client device, such as 102(J) to develop content to be served on a client device with a particular screen configuration on which the content will run, such as client device 102(1). DDC tools 122 provide an application program interface (API) upon which developers can build applications and services for a particular client platform, such as a device with a particular screen configuration like an eBook reader device such as eBook reader device 102(1). An illustrative API implementation utilizes a particular dynamic markup language (DXyml) for structuring presentation of content on particular client devices with a particular screen configuration.

Users may employ the client devices 102 to request content from the host 104. In one scenario, a client device 102 sends a request (such as a uniform resource identifier (URI) request) to the servers 108. Upon receiving the request, the servers 108 process the request and access a content store 110 to retrieve the content. The servers 108 return the content to the requesting client device 102, which invokes a rendering engine to render the content and allow the user to interact with the content. In one implementation, the returned content may include links that enable the client device to request downloadable content stored and offered by the host 104. Other user interfaces, such as dedicated applications implemented using software instructions and stored locally on a device 102, may additionally or alternatively be used to interact with the host 104.

In one implementation, the content store 110 may store the content in collections of pre-created presentations 112. In an aspect of at least one embodiment, presentations include interactive content, dynamic content, client device information, pages, and sheets created utilizing DDC tools 122. Each collection of presentations 112 may be associated with a particular screen configuration. The screen configuration includes many characteristics including, for example, screen size, screen type, refresh rate, device type, manufacturer, and so forth. The association between presentations 112 and corresponding screen configurations may be implemented through data structures in the content store 110, such as tables that associate listings of presentations, pages, and sheets with various types of devices and/or screen configurations.

In one implementation, presentation 112 is created using a creator 114, which is shown implemented as a software module that executes on servers 108 (although it may be implemented on other computing devices separate from servers 108, such as personal computer 102(J)). The creator 114 includes a DXyml editor 116 that enables designers to craft the presentations 112 using the display dependent markup language. The DXyml editor 116 allows the designers to identify dynamic and static content elements to be included in the presentation and to specify two-dimensional coordinates at which to position the content elements for display on a particular screen configuration. A more detailed discussion of the DXyml markup language is provided below with reference to FIGS. 2-4.

In one implementation the presentations 112 may be created in advance and stored in the content store 110 for subsequent service to the client devices 102(1)-(M). Such presentations are preconfigured for corresponding screen configurations. Alternatively, the presentations 112 illustrated in FIG. 1 may represent presentation templates that are used to dynamically create presentations on demand. In that case, the presentation templates are configured for various screen configurations. With dynamic presentation creation, a suitable presentation template is selected and populated with content to form a presentation including dynamic content elements that may be served in response to a user request or triggering event such as power-on, WAN activation, low-battery, etc.

The servers 108 also support a selector 118, which is shown as a software module. The selector 118 selects one or more presentations 112 to return to a requesting client 102. The selector 118 may make the selection based in part on the screen configuration of the requesting device. There are many ways that the selector 118 may use to determine the screen configuration of the requesting device. In one approach, the client 102 includes the screen configuration as part of the request. In another approach, the servers deduce a probable screen configuration based on the DDC tools being requested. In yet another implementation, the servers may be designated to support exclusively a single type of device, and hence all displays are the same.

The presentations 112, when served to the clients 102, define how the content is to be arranged on the display. As noted, the DXyml markup language allows the designer to specify an x-coordinate and a y-coordinate that precisely locate the content element on the display. By designing different collections of presentations for different screen configurations, the same content may be arranged differently depending on the display. To illustrate this point, notice that the three clients 102(1), 102(J), and 102(M) are all rendering presentations having content elements represented by an image "ABC" and a greeting "Hello". However, each client has a different screen configuration.

The eBook reader device 102(1) has one display type (e.g., electronic paper display technology) on which a presentation 130 of content elements is rendered. If the underlying DXyml source for page 130 were revealed, as presented by the magnifying glass and a source window 132, the image "ABC" is positioned at the two-dimensional coordinates of (x=35, y=11) and the greeting "Hello" is placed at coordinates of (x=45, y=78). These positions were established by the page designer for this particular screen configuration. More specifically, the coordinates (35, 11) and (45, 78) uniquely specify corresponding pixels in the display of the eBook reader device 102(1) at which the image and greeting are positioned.

In contrast, the PDA 102(M) has a different display type (e.g., a touch screen display panel) on which another page 124 is rendered. The DXyml source code reveals that the image "ABC" is positioned at the two-dimensional coordinates of (x=10, y=6) and the greeting "Hello" is placed at coordinates of (x=10, y=29), as exhibited in a source window 126. Thus, due to the different screen configuration, the content elements "ABC" and "Hello" are located at different places on the eBook reader device 102(1) and the PDA 102(M).

In this manner, through serving different presentations to different devices, the servers 108 may essentially dictate how content is depicted on the various devices 102. In this sense, the clients 102 exhibit a thin client model in which the clients need not run sophisticated browsers to render the pages; rather, the servers 108 tell the clients precisely where to place the content on their screens.

The servers 108 may store and serve presentations 112 including DXyml-based content alone, or in conjunction with conventional web pages crafted using other markup languages such as html. In FIG. 1, the personal computer 102(J) represents a device that receives and renders, within a browser, conventional web pages 128 crafted using traditional html.

Additionally, presentation 112 may be created by a developer using a scripting language on a client such as the personal computer 102(J). The developer may access an API store 120 to download API specifications for the DDC tools 122, such as API modules, in order to design content for presentations 112 using the display dependent markup language (such as DXyml). A DXyml editor 116 may be provided which allows the designer to identify content elements to be included in the presentation and to specify two-dimensional coordinates at which to position the content elements for display on a particular screen configuration which will not be stored in the content store 110. For example, the developer may create a presentation 112 in a scripting language and utilizing downloaded API modules 122 from the API store 120 and the DXyml editor 116. Furthermore, the developer may download selector 118, which may facilitate selecting presentations for design based in part on the screen configuration of a target device such as an eBook reader 102(1). The developer may create the presentation 112 on personal computer 102(J), and then transfer the presentation 112 to an eBook reader 102(1). Alternately, the developer may create the presentation 112 on others of the client devices 102, such as a laptop, a PDA 102(M), or an eBook reader device 102(1). A more detailed discussion of the DXyml markup language is provided below with reference to FIGS. 2-4. One or more of the API specifications for the DDC tools 122, the DXyml editor 116, and/or selector 118 may be downloaded as part of a software development kit (SDK), not shown.

In one implementation the presentations 112 may be created in advance on one client device 102 and stored statically on another client device 102 until a predetermined triggering event occurs associated with the client device 102 on which the presentations 112 are stored, for example on client device 102(1). Such presentations 112 are preconfigured for corresponding screen configurations.

The presentations 112, when served to the clients 102, define how the content is to be arranged on the display. As noted, the DXyml markup language allows the designer to specify an x-coordinate and a y-coordinate that precisely locates the content element on the display.

DXyml Markup Language

Figure 2:
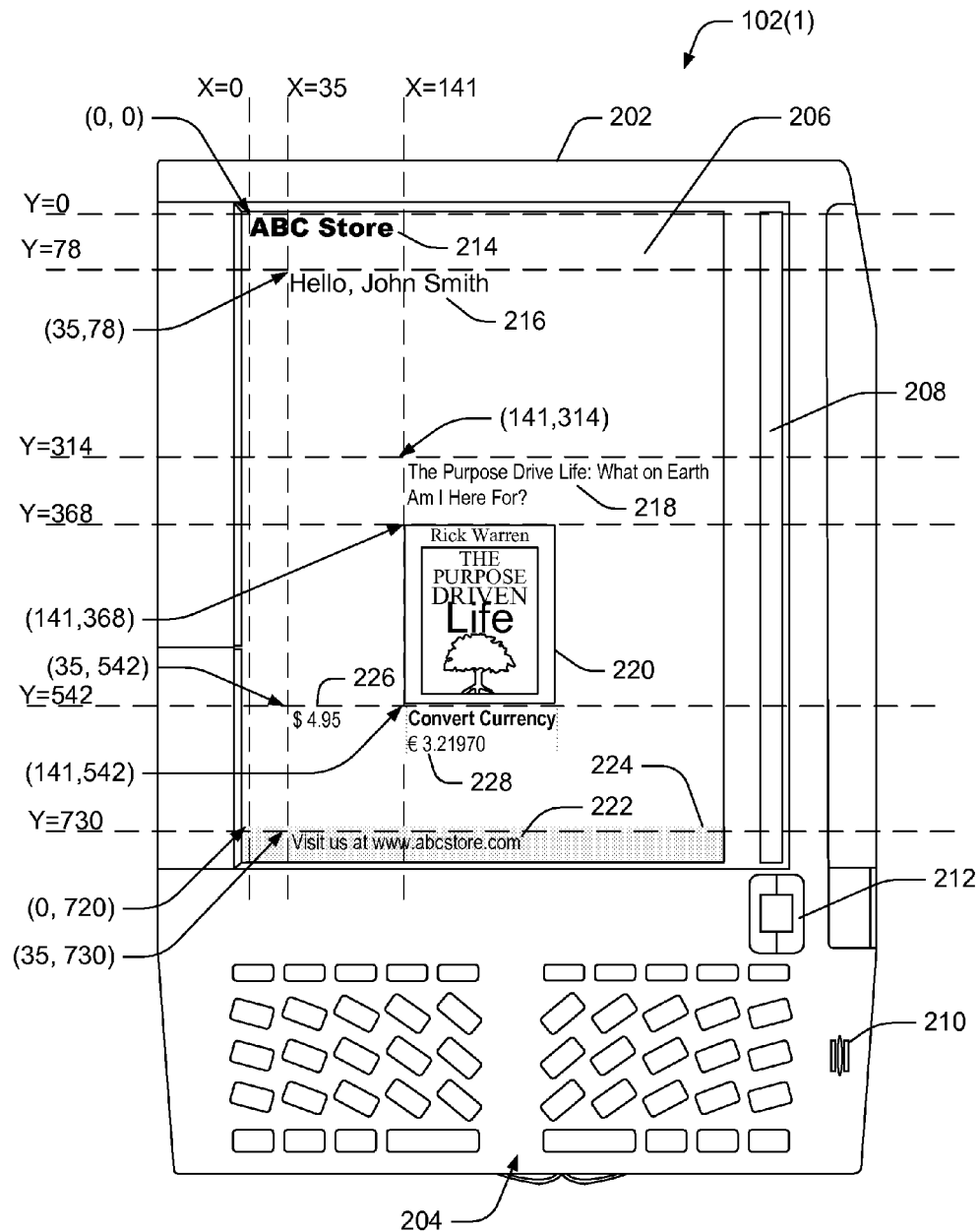
FIG. 2 is a front plan view of an illustrative handheld electronic book ("eBook") reader device with an illustrative page depicted on the device's display. The dynamic elements of the page may be created using the dynamic display dependent markup language.
Figure 3:
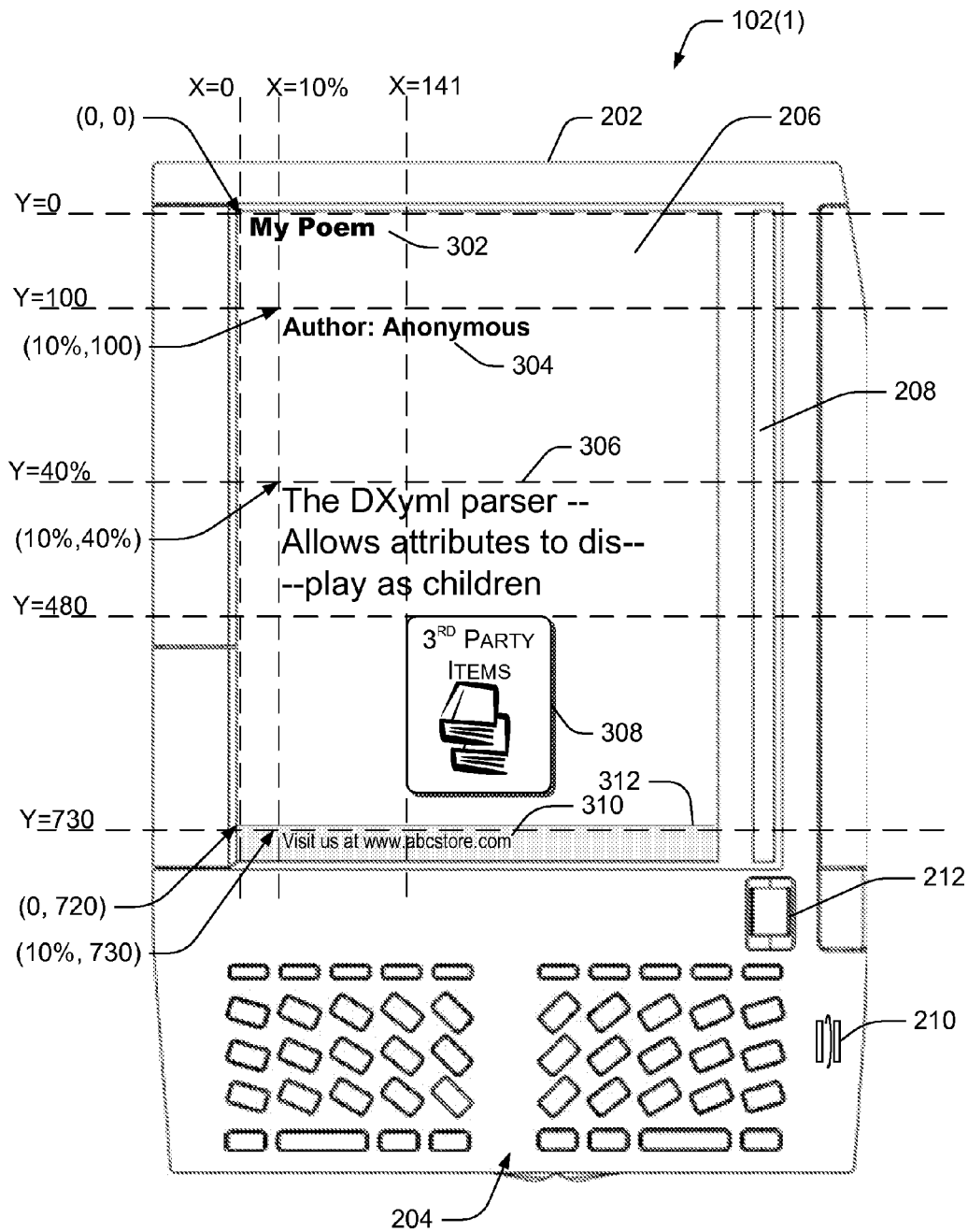
FIG. 3 is another front plan view of the illustrative handheld electronic book ("eBook") reader device with an illustrative sheet depicted on the device's display. The sheet may be created using the dynamic display dependent markup language.
Figure 4:
FIG. 4 illustrates excerpts of the dynamic markup language that defines the sheet rendered on the eBook reader device in FIG. 3.

As discussed, the DXyml markup language enables page designers to designate precise locations of the content elements for a given display type. In this manner, the clients do not need to run browsers or other html layout engines to layout how and where the content elements are positioned on the display. Instead, the client devices merely parse the DXyml code and place the elements at the locations prescribed by the DXyml instructions in the pages designed for the client displays. To further illustrate these concepts, FIGS. 2, 3, and 4 show how content elements are positioned on a particular screen configuration according to the underlying DXyml markup language. FIG. 2 shows the eBook reader device 102(1) rendering a page with multiple content elements. The page was created using DXyml markup language and designed specifically for the screen configuration of the eBook reader device 102(1). FIG. 3 shows the eBook reader device 102(1) rendering a sheet with multiple content elements. The sheet was created using DXyml markup language and designed specifically for the screen configuration of the eBook reader device 102(1). The source of the markup language used to render the content elements of FIG. 3 is illustrated in FIG. 4.

DXyml is a dynamic XML-based markup language which provides support for a variety of scripting languages, such as for client-side content development. For example, DXyml may provide support for ECMAScript-type dialects like JavaScript and JScript. DXyml is a specialized markup language, providing all of the necessary features to create dynamic content on a multitude of devices, for example on devices such as an eBook reader device, and requiring only a lightweight "browser" on the device. A lightweight "browser" is one that does not require the processing power of typical browsers such as Internet Explorer™ and Firefox™. DDC tools and DXyml provide lightweight web enabled APIs for use on devices such as eBook reader devices, without cascading style sheets. Furthermore, additional APIs to be exposed on such devices need not be connected to a network.

DDC tools 122 provide a standard for creating dynamic content rendered using DXyml on an eBook reader device. Furthermore, DDC tools 122 allow developers to program function calls triggered by particular device events. Additionally, DDC tools 122 allow developers to write applications that interact with particular devices such as the eBook reader device 102(1).

DXyml provides support to many applications. For example, DXyml may support: an online content store; RSS Readers including display of textual components and selectable HTML links via a lightweight web browser); and Dynamic digital content (DDC) presentations, which are DXyml-based applications written for an eBook reader platform. For example, such presentations may include stock tickers, weather, sport scores, dynamically updating eBooks, etc.

Before describing the Dynamic Display Dependent Markup Language Interface further, a brief description of the eBook reader device 102(1) will prove helpful for subsequent discussions. Referring now to FIG. 2, the eBook reader device allows users to consume electronic content (e.g., text, graphics, multimedia, interactive, dynamic and the like), such as that found in electronic books, magazines, RSS feeds, newspapers, games and the like. The eBook reader device 102(1) has a body or housing 202, a keyboard 204, and a dual display system comprised of a first display 206 and a second display 208.

The device keyboard 204 includes a plurality of keys. In the illustrated implementation, the keyboard includes at least 26 alphabet keys arranged in a QWERTY format as well as other function keys (such as space bar, control keys, function keys, and so forth). The keyboard may additionally or alternatively include other arrangements of the 26 alphabet keys that do not conform to the QWERY layout.

The first display 206 in the dual display system presents content in a human-readable format to the user. The content presented in the first display 206 may take the form of electronic books, newspapers, or other readable or viewable materials. For example, the display 206 provides the text of the electronic books and also depicts any illustrations, tables, or graphic elements that might be contained in the electronic books. In one implementation, the content display 206 employs display technology with a relatively slow refresh rate, such as an electronic paper display, in exchange for a relatively low rate of power consumption. This tradeoff serves to maximize battery life. In some implementations, the display 206 is not responsive to user input.

The second display 208 of the dual display system is a narrow screen located adjacent to the content display 206, illustrated positioned to the right of the content display 206, although it may be located elsewhere in the housing 202 in other implementations. The narrow display screen 208 may be responsive to user input. Additionally, the narrow display screen 208 may enable presentation of graphic elements that correspond to content displayed in the content display 206. For example, some displays that may be used with the implementations of the narrow display include organic LEDs, TFT, and PN LCD.

The narrow display screen 208 provides many diverse functions. For instance, it may present a form of user interface that enables the user to command the device to turn pages of text, scroll up or down pages of text, zoom in or zoom out, navigate to other locations, or the like. Additionally, for example, the user might tap one part of the narrow display 208 to scroll in one direction, and may tap another part of the narrow display 208 to scroll in another direction. The device may include additional user inputs, such as a page turning mechanism 210, a scroll wheel 212, keys in the keyboard 204, or soft keys depicted on one or both of the displays.

As illustrated in FIG. 2, a page is rendered on the content display 206. A page may include dynamic content, such as that supported by DDC tools. The term "page", when applied in the context of the eBook reader device 102(1), refers to a collection of content that is presented at one time in the first display 206. Thus, a "page" may be understood as a virtual frame of the content, or a visual display window presenting the content to the user. Pages are not fixed permanently, in contrast to the pages of published "hard" books. Instead, pages may be redefined or repaginated when, for example, the user chooses a different font for displaying the content in the first display 206.

One alternative presentation of content on display 206 enabled by DXyml is sheet presentation. The term "sheet", when applied to the context of the eBook reader device 102(1), refers to a collection of content that is presented at one time in the first display 206 which is dynamic in the sense that a sheet may include dynamic content, such as that supported by DDC tools 122, but sheets may not be redefined or repaginated in the same way that pages can. Sheets provide permanently fixed presentation space similar to pages of published "hard" books tailored to a particular device such as the eBook reader device 102(1).

The illustrated page in FIG. 2 includes eight content elements: a text logo "ABC Store" 214, a text greeting "Hello, John Smith" 216, a text book title 218 ("The Purpose Driven Life: What on Earth Am I Here For?"), a book cover image 220, a text invitation 222 ("visit us at www.abcstore.com"), a light gray rectangle 224, a price in U.S. dollars 226 ("$4.95"), and a currency converter 228 ("€ 3.21970"). Also shown to aid in understanding are horizontal and vertical dashed lines to represent certain rows and columns of pixels in the eBook display; such dashed lines are not a part of the display. In this example, the pixel rows are enumerated 0, 1, 2, . . . , to R from left to right and the pixel columns are enumerated 0, 1, 2, . . . , to C from top to bottom, thereby placing the location (0, 0) at the upper left corner of the display. As one example, the content display 206 is 600×800. In other embodiments, the origin of the axes may be located elsewhere in the display (e.g., top right, bottom right, bottom left, center, etc.).

The text logo "ABC Store" 214 is positioned at the pixel specified by two-dimensional coordinates (0, 0) having an x-coordinate of zero (x=0) and a y-coordinate of zero (y=0). More specifically, the upper left corner of the logo image 214 is placed on the pixel location (0, 0). Similarly, the upper left corner of text greeting "Hello, John Smith" 216 is placed precisely at the pixel specified by the coordinates (35, 78). The text book title 218 is positioned at the pixel designated by the coordinates (141, 314) and the book cover image 220 is arranged at the coordinates (141, 368). The book price in U.S. Dollars 226 is positioned at the pixel designated by the coordinates (35, 542) and the Dynamic Currency Converter 228, providing dynamic conversion to selectable currencies, in this example illustrating conversion to Euros, is arranged at the coordinates (141, 542). Lastly, in this example, a text invitation "visit us at www.abcstore.com" 222 is positioned at the coordinates (35, 730) and a light gray rectangle 224 is drawn with the upper left corner placed at the coordinates (0, 720).

As illustrated in FIG. 3, a sheet is rendered on the content display 206. The illustrated sheet in FIG. 3 includes a presentation created utilizing DDC tools of a user authored poem containing five content elements: a text logo "My Poem" 302, an author's name 304, a user authored poem "The DXyml parser—Allows attributes to dis—play as children" 306, a 3$^{rd}$ party content image 308, a text invitation 310 ("visit us at www.abcstore.com"), and a light gray rectangle 312. Also shown are horizontal and vertical dashed lines to represent certain rows and columns of pixels in the eBook display. In this example, the pixel rows are enumerated 0, 1, 2, . . . , to R from left to right and the pixel columns are enumerated 0, 1, 2, . . . , to C from top to bottom, thereby placing the location (0, 0) at the upper left corner of the display. As one example, the content display 206 is 600×800.

The text logo "My Poem" 302 is positioned at the pixel specified by two-dimensional coordinates (0, 0) having an x-coordinate of zero (x=0) and a y-coordinate of zero (y=0). More specifically, the upper left corner of the logo image 302 is placed on the pixel location (0, 0). Similarly, the upper left corner of the author's name "Author: Anonymous" 304 is placed precisely at the pixel specified by the coordinates (10%, 100). Similarly, the upper left corner of user authored poem "The DXyml parser—Allows attributes to dis—play as children" 306 is placed precisely at the pixel specified by the coordinates (10%, 40%) designating a relative percentage based on screen size. Designating display positions relative to overall screen size has the advantage that developers need not know exactly what size screen will display the content in order to create content which may be accommodated by various screen sizes. The image 308 is positioned at the pixel designated by the coordinates (141, 480). Lastly, in this example, a text invitation "visit us at www.abcstore.com" 310 is positioned at the coordinates (10%, 730) and a light gray rectangle 312 is drawn with the upper left corner placed at the coordinates (0, 720).

FIG. 4 shows the underlying DXyml source 400 that produces the presentation layout shown in FIG. 3. The source 400 has a series of instructions defined by pairs of delimiters that are denoted as less-than symbols "<" and greater-than symbols ">". Some delimiters identify content elements to be presented on a display. For instance, the text element "My Poem" is defined by an instruction 402 contained within a delimiter pair.

Certain instructions specify location information for placement of content elements within a two-dimensional space. In one implementation, the location information is specified in instructions adhering to a syntax or format as follows:

<type>
  x="x relative percentage based on screen size"
  y="y relative percentage based on screen size"
  content_element
<type> where "<" and "/>" are the delimiters of the instruction, "type" represents a type of content element (e.g., image, text, shape, etc.), "x=" sets an x-coordinate, "y=" sets a y-coordinate, "x relative percentage based on screen size" is a number for the x-coordinate, "y relative percentage based on screen size" is a number for the y-coordinate, and "content_element" is the content element to be positioned.

As an example, an instruction 404 specifies that the text "Author: Anonymous" is to be positioned at the coordinates (10%, 100), as seen by the instruction components x="10%" and y="100". Notice, in FIG. 3, the Author designation is rendered at the location (10%, 100) according to this instruction. As another example, an instruction 406 specifies that the content element, "myPoem" is to be positioned at the coordinates (10%, 40%), as seen by the instruction components x="10%" and y="40%". Again, in FIG. 3, the poem 306 is rendered with its upper left corner beginning at the pixel location (10%, 40%). Similarly, an instruction 408 specifies that the third party content image is to be positioned at the coordinates (141, 480), as seen by the instruction components x="141" and y="480". As a result, the upper left corner of the third party content image 308 in FIG. 3 is positioned at pixel location (141, 480).

One notable aspect of the DXyml source code is that, unlike html, instructions DXyml need not be written in a left-to-right, top-down manner in correlation with how the elements will eventually be arranged when rendered on the display. Instead, the content elements can be described anywhere in the document. As one example, an instruction 410 is provided to write the text string "visit us at www.abcstore.com" at a pixel location (10%, 730). In FIG. 3, this text invitation 310 is shown at the lower left portion of the display 206. Notice, in the DXyml code 400 of FIG. 4, that the instruction 410 is the opening text instruction, followed by the text instruction 402 to write the logo "My Poem" at the pixel location (0, 0) at the top left portion of the screen. Thus, the order of the instructions in the DXyml code 400 does not correlate with the arrangement on the display because even though instruction 410 is before instruction 402, the corresponding element "visit us at www.abcstore.com" is positioned below the text "My Poem" on the display 206. This feature of the DXyml code is achieved because the x and y coordinates are stipulated as part of the instruction, thereby allowing the full screen to be filled with the most quickly rendered information while additional information is still loading, leading to an enhanced user experience.

Moreover, as described below in more detail, the DXyml engine may parse the instructions and render content elements in separate passes. For example, in one implementation, the DXyml engine first processes and renders non-image elements on the display, and then subsequently processes and renders the image elements.

Further, the relative depth of content elements on a page, known as "z order", is implied in the instructions of the DXyml code. To illustrate this point, an instruction 412 in FIG. 4 directs the drawing of a rectangle having its upper left corner positioned at the pixel location (0, 720). According to the attributes in the instruction, the rectangle has a light gray fill and dimensions of 80 pixels in height by 600 pixels in width. As shown in FIG. 3, the light gray rectangle 330 is drawn at the bottom of the display screen 206. With reference again to FIG. 3, the text instruction 410 positions the text string "visit us at www.abcstore.com" at a location (10%, 730) that resides within the rectangle. Since the text instruction 410 follows the rectangle instruction 412, the z order implied in this sequence is that the rectangle is drawn first and the text invitation is written over the rectangle. This is shown in FIG. 3, where the rectangle 312 resides behind the text invitation 310 to convey a relative depth of the two content elements.

The DXyml engine may support a variety of scripting languages via an embedded scripting engine. For example, the DXyml engine may embed an engine like the Rhino JavaScript Engine. The DXyml engine will also support an extended subset of existing APIs. For example, the DXyml engine may support an extended subset of DHTML, JavaScript™, and Asynchronous JavaScript™ with XML (Ajax) application programming interfaces (APIs). DXyml may use JavaScript™ in an asynchronous fashion. The DXyml engine may also support a subset of document object models (DOMs), for example, for parsing and creating xml documents. DXyml documents are not parseable via DOM. Instead, an element's JavaScript variable name will correspond to its I.D. The DXyml document can be referred to by the global name xyml. The DXyml engine supports a specialized DOM-like API which may, for example, be used to dynamically create new objects and assign the dynamically created new objects to the appropriate parent object. Parent objects may be objects such as xyml documents, sheets, or overlays. Overlays are a window that may appear at a higher layer than the screen's window, and whose dimensions may be less than the screen's. One object can be synchronized at a time, and the order or frequency of synchronizing is not guaranteed.

The DXyml markup language has many different instruction types. Some of these instruction types are shown in the source 400 of FIG. 4, and will now be described. The first line 414 of source 400 names the top level element "xyml" which encapsulates the entire document. This element has a corresponding scripting object: xyml(global singleton, named xyml). The xyml node has the following attributes:
 activesheet—name of the sheet that is visible initially.
 Scripting Object Attributes:
 activesheet—name of the sheet that is currently visible, setting this renders the previous visible sheet invisible and triggers its on Invisible handler
 firstChild (readOnly): first child element
 lastChild (readOnly): last child element
 Functions:
 openOverlay(overlay): open an overlay
 closeOverlay( ): close an overlay
 addChild(element): add a Xyml element to the current Xyml document
 removeChild( ) remove a Xyml element from the current Xyml document
 getChildren( ) return a list of all immediate child elements
 getAllChildren( ) return a list of all child elements, recursively
 removeAllChildren( ) remove all children recursively
 insertBefore(element, id): add a child before element with id id.
 hasChildren( ) returns true if it has children, false otherwise
 getElementById(id): returns the element with id id. This is equivalent of just referring to the variable with name id.
 openOverlay(overlay): open the Overlay
 closeOverlay( ): close the Overlay
 gotoURL(url): exit the current application and open the url in the Access browser
 gotoStore( ): exit the current application and open the Store
 goHome( ) exit the current application and open Home
 goBack( ) trigger the HistoryManager to go back
 parse(xml): parse an xml representation of DXyml elements, returns an array of elements A "handler" instruction, as represented by instruction 416, represents the xyml element's handler. The xyml element and sheets may contain handlers. Handlers that are child elements of sheets will only become active when the parent sheet is visible, and will override handlers that are child elements of the xyml element. The handler has the following attributes:
 trigger: the event that will trigger a handler's script to execute. Valid values are:
 on Load: when the Xyml document first loads
 on Close: when the Xyml document is closed, such as by switching apps or powering off the device
 on NextPage: when the NextPage key is pressed (should there be different handlers for the left and right next page keys?)
 on PrevPage: when the PrevPage key is pressed
 on Back: when the Back key is pressed
 on KeyPress: when a key on the keyboard is pressed
 on Sleep: when the Power Manager causes the device to sleep
 on Wakeup: when the device wakes up from sleep
 on BatteryLow: when the device receives a low battery event
 on WirelessOff: when the WAN state switches from enabled to disabled
 on WirelessOn: when the WAN state switches from disabled to enabled
 action: Javascript code to execute A "menu" instruction, (not shown in FIG. 4), has a corresponding scripting object and allows designers to create arbitrary menus. An AppMenu is created by default. The menu objects have the following attributes:

id—Label of the menu. The user sees this label on the menu when rendered.
x/y—The coordinates of the top left corner of the menu.
Scripting Object Attributes:
id—Label of the menu. The user sees this label on the menu when rendered.
x/y—The coordinates of the top left corner of the menu.

A "menuitem" instruction, (not shown in FIG. 4), represents an item that appears in a menu. When a menuitem is contained in a menu object, the menuitem will display in that menu object. When a menuitem is not contained in a menu object, the menuitem will display in the AppMenu, in the lower right hand corner. The menuitems have the following attributes:

id
title: Text that is displayed for the menuitem.
enabled: boolean
Handlers
onSelect: Triggered when the menuitem is selected
Corresponding Scripting Object: MenuItem
Scripting Object Attributes:
id
title
enabled
onSelect A "sheet" instruction, as represented by instruction 418, represents the DXyml sheet element. A "sheet" instruction, as represented by instruction 418, provides for a single screen layout of a set of displayable elements and handlers. Only one sheet may be viewable at a time. A visible sheet is one whose elements can be drawn and whose handlers can be triggered. A DXyml chunk may define any number of screen layouts via sheet instructions. The sheet has the following attributes:

id
Corresponding Scripting Object: Sheet
Scripting Object Attributes:
id
visible(readonly): boolean, whether the sheet is visible
firstChild (readOnly): first child element
lastChild (readOnly): last child element
Functions:
addChild(element): add an xyml element to the current xyml document
removeChild( ) remove an xyml element from the current xyml document
getChildren( ) return a list of all immediate child elements
getAllChildren( ) return a list of all child elements, recursively
removeAllChildren( ) remove all children, recursively
insertBefore(element, id): add a child before element with id id
hasChildren( ) returns true if it has children, false otherwise An "overlay" instruction, (not shown in FIG. 4), represents a window that appears at a higher layer than the screen's window, and whose dimensions may be less than the screen's. Overlays may be configured such that at most one overlay can be displayed at a time. Alternately, overlays may be configured such that multiple overlays may be displayed concurrently. The overlay has the following attributes:

id
x/y
width
height
Handlers
onOpen
onClose
Corresponding Scripting Object: Overlay
Scripting Object Attributes:
id
x/y
width
height
firstChild (readOnly): first child element
lastChild (readOnly): last child element
Functions:
close( )
addChild(element): add an xyml element to the current xyml document
removeChild( ) remove an xyml element from the current xyml document
getChildren( ) return a list of all immediate child elements
getAllChildren( ) return a list of all child elements, recursively
removeAllChildren( ) remove all children, recursively
insertBefore(element, id): add a child before element with id id
hasChildren( ) returns true if it has children, false otherwise A "text" element is a container for text. As represented by instructions 402, 404 and 406, when a text element is first displayed, it will display as much of its contained data as it can fit on the display screen. Text instructions nextPage( ) and prevPage( ) will automatically show the next or previous screen's worth of data. In an aspect of one implementation, "y" corresponds to the base of the first line. Alternately, "y" may correspond to the top of the text container. Text has the following attributes:

id
data: the contained text, which may contain spans or formatting elements
x
y
width
height
fontFamily
style
size
Child Elements of Text.Data
span
b
i
a
Corresponding Scripting Object: Text
Scripting Attributes
id
data
x
y
width
height
fontFamily
style
size
Functions: Note: Page and Line Numbers are Zero Indexed
nextPage( )
prevPage( )
firstPage( )
lastPage( )
gotoPage(pageNum)
gotoLine(lineNum)
getNumLines( )—returns total number of parsed lines getNumLinesPerPage( )—returns number of lines that fit in bounding box
currentPage( )—returns the current page number A "span" instruction, (not shown in FIG. 4), represents a subset of the data in a text element. The span instruction has the following attributes:
   id
   fontFamily
   style
   size
   Child Elements:
   b
   i
   a
   Corresponding Scripting Object: Span
   Scripting Attributes:
   id
   fontFamily
   style
   size
   data A "textbox" instruction, (not shown in FIG. 4), represents a textbox, which in DXyml will be embedded directly in the parent of the textbox. The textbox instruction has the following attributes:
   id
   x/y
   width
   value
   Handlers:
   onChange: Triggered after the user attempt to close the textbox A "line" instruction, (not shown in FIG. 4), represents a line graphic. The line instruction has the following attributes:
   id
   x1
   x2
   y1
   y2

A "rectangle" instruction, (not shown in FIG. 4), represents a rectangle graphic. The rectangle instruction has the following attributes:
   id
   x
   y
   width
   height
   thickness
   fill
   color A "hidden" instruction, (not shown in FIG. 4), represents a hidden element. The hidden instruction has the following attributes:
   id
   value A "submit" instruction, (not shown in FIG. 4), represents submitting an element. The submit instruction has the following attributes:
   id
   x
   y
   title
   url
   Handlers:
   onSelect A "checkbox" instruction, (not shown in FIG. 4), represents a checkbox element. The checkbox instruction has the following attributes:
   id
   x
   y
   Handlers:
   onSelect
   onChange A "radio" instruction, (not shown in FIG. 4), represents a group of radiobuttons. The radio instruction has the following optional attributes:
   id—the element id
   selected—the id string of a contained radiobutton that is selected by default
   onSelect—a script element, called when one of the contained radiobuttons is selected A "radiobutton" instruction, (not shown in FIG. 4), represents a radiobutton element. The radiobutton instruction has the following attributes:
   id
   x
   y
   Handlers:
   onSelect
   onChange An "image" instruction, as represented by instruction 408, displays an image. The image instruction has the following attributes:
   x/y—The coordinates of the top left corner of the image.
   width/height
   id
   filename (mandatory): Filename of image. When a url is specified, image is saved under this filename after downloading
   url—refers to a location of an image to download, which may be local or remote depending on the URL string
   Functions:
   reload( ) force the image to be deleted and reloaded. Only valid if url is specified
   deleteFile( ): delete the file corresponding to the filename attribute
   fileExists( )
   lastModified( )

A "select" instruction, (not shown in FIG. 4), represents a list of states. The select instruction has the following attributes:
   x
   y
   defaultvalue
   name
   textheight
   Handlers:
   onSelect An "option" instruction, (not shown in FIG. 4), is a member of the select instruction and facilitates building the list of states. Each state of the select instruction is its own option. The option instruction has the following attributes:
   name
   value Several attributes common to multiple instructions exist, including:
   id: Unique identifier for an element
   title: Text that is displayed for an element
   x, y, width, height, right, bottom: Values can refer to pixel location (i.e., "100" or "100 px") or relative percentages based on the screen size (i.e., "50%").

Unlike HTML, Divs can have width and height or right and bottom specified

If x or y are negative, they refer to the distance from the right or bottom of the element's container, respectively. Specifying a negative y value may cause an object to move up when the Search box is displayed.

If bottom is specified instead of height, a positive bottom refers to the distance from the top of the element's container (y+height), while a zero or negative height indicates the distance from the bottom of the container. Similar for right.

visible: whether the element should be drawn (defaults to true)

name: Element's name. For submit elements, this is always displayed, but for most elements, it is only displayed if two element's selectables appear on the same line, in which case a list of element names will be displayed A common handler, onselect, exists. This handler turns an element into a Selectable.

Although not shown in FIG. 4, functions and elements are provided for ECMAScript type dialects like JavaScript and Jscript. The following examples are provided for JavaScript.

Global Functions:
print( )
alert( )
setTimeout( )
screen:
Attributes
top
left
width
height
colorDepth
Functions
repaint( )
XMLHttpRequest: Note, only asynchronous requests are supported
Attributes
responseText
responseXML
readyState—either 0 (for uninitialized), 1 (for connecting), or 4 (for finished)
status—HTTP response code, 200 for successful
onreadystatechange—function to invoke after state change
Functions
open(method, url)
    method—"GET" or "POST"
send(postContents)
DOMDocument
Attributes
documentElement
Functions
parse(text)
evaluate(xpath)
DOMElement
Attributes
all[ ]
attributes[ ]
childNodes[ ]
firstChild
previousSibling
nextSibling
name (i.e. tag name)colorDepth
Constructor
DOMElement(tagName)
Functions
addAttribute(name, value)
appendChild(e)—e is a DOMNode
child(i)—returns ith child (0 index)
createElement( )
createTextNode( )
evaluate(xpath)
getAttribute(name)
getChildren( )
getElementsByTagName( )
hasAttribute( )
removeAllChildren( )
removeChild(e)—e is a DOMNode
toString( )
TextNode
Attributes
Data
Constructor
TextNode(text)
device
Attributes
latitude
longitude
Functions
wirelessEnabled( )
battery( )
coordinatesAvailable( )—are the latitude and longitude available Several specific API calls are supported. For file system access, both a "File" object and a "Path" object, (neither shown in FIG. 4), are provided. Functions include:
writeFileAsString(string, filename)
writeFileAsArray(array, filename)
readFileAsString(filename)
readFileAsArray(filename)
writePropertiesFile(object, filename)
readPropertiesFile(filename)
saveImage(image, filename)
loadImage(filename)
fileExists(filename)
delete(filename)
copy(filename 1, filename2)
isFile(filename)
isDirectory(filename)
list(directory)
lastModified(filename)

A "Device.getInfo(<param>)" instruction, (not shown in FIG. 4) is provided as a call to get information about the operating device. <param> can be one of a list of strings that are used to determine the return value. Strings may include:
'memory' will return an object with 'total' and 'free' parameters representing the total memory, and free memory.
'disk' will return an object with 'free' and 'capacity' parameters for free space, and max capacity (of mass storage)
'system' will return the device serial number, OS version, and device model (as object parameters).
'software' will return an array of objects, one for each widget, with that widget's version number
'profile' will return the username, and device name
'location' will return the device's current location in longitude and latitude when that feature is enabled
'wireless' will return the devices' connection status Synchronizing: DDC tools and the DXyml markup language allow applications developed for a client device with a particular screen configuration on which the content will run, such as client device 102(1), to have the ability to execute code when the applications are inactive and the network connection, such as a WAN, is enabled. For example, an email client may want to download new emails after the device downloads new newspaper issues. For an application to be synchronizable, the application specifies a synchronization-file in the application's configuration file, such as config.wid. When the configuration file contains a synchronization-action property, its value is executed as a script.

Regardless of whether the application is running while synchronizing, the only DXyml elements the script can access are xyml (which is still a global singleton) and images (which have to be allocated in the script). Scripting objects, such as JavaScript objects (file, path, XMLHttpRequest, DOM objects, etc.) are also accessible. Synchronizing applications, such as those running in the background, cannot access the screen. During synchronization, the alert( ) function will behave like the print( ) function, for example, by causing a message to print to a log file and not display on the screen.

DXyml-based applications written for an eBook reader platform typically contain at least two files:
1. a configuration file, such as config.wid, which is a properties file containing at least the following properties:
    name (mandatory)—the name of the application, as displayed in the Home menu
    author (mandatory)—the name of the author of the application, as displayed in the Home menu
    xyml (mandatory)—filename of the DXyml file
    version—currently 1.0
    syncfile—a scripting file, such as a Javascript file, containing code for synchronizing
    syncaction—code to execute to trigger the synchronization
    syncifactive—boolean, whether the application should synchronize when it is active, defaults to false
2. a DXyml file, which must match the xyml property in the configuration file, e.g., config.wid The DXyml parser may allow attributes to be displayed as child elements. For example, in handler nextHandler, action is a child element, but in handler prevHandler, action is an attribute.

As introduced above, DDC tools facilitate definition of alternate presentation screens also known as sheets. When a DXyml document contains sheets, the DXyml parser may allow exactly one sheet to be visible at all times, alternately multiple sheets may be visible, but in any event the content contained on each sheet remains fully presented on that sheet. Handlers and elements may be defined outside of a particular sheet and associated with the DXyml document. Additionally, handlers and elements may be defined within a particular sheet. Handlers that are defined within a particular sheet are only active when the sheet is visible and override the document's handlers. For example, if there are multiple on NextPage handlers in a document, at most one on NextPage handler may be triggered at any particular time.

Illustrative Process Scenarios

Figure 5:
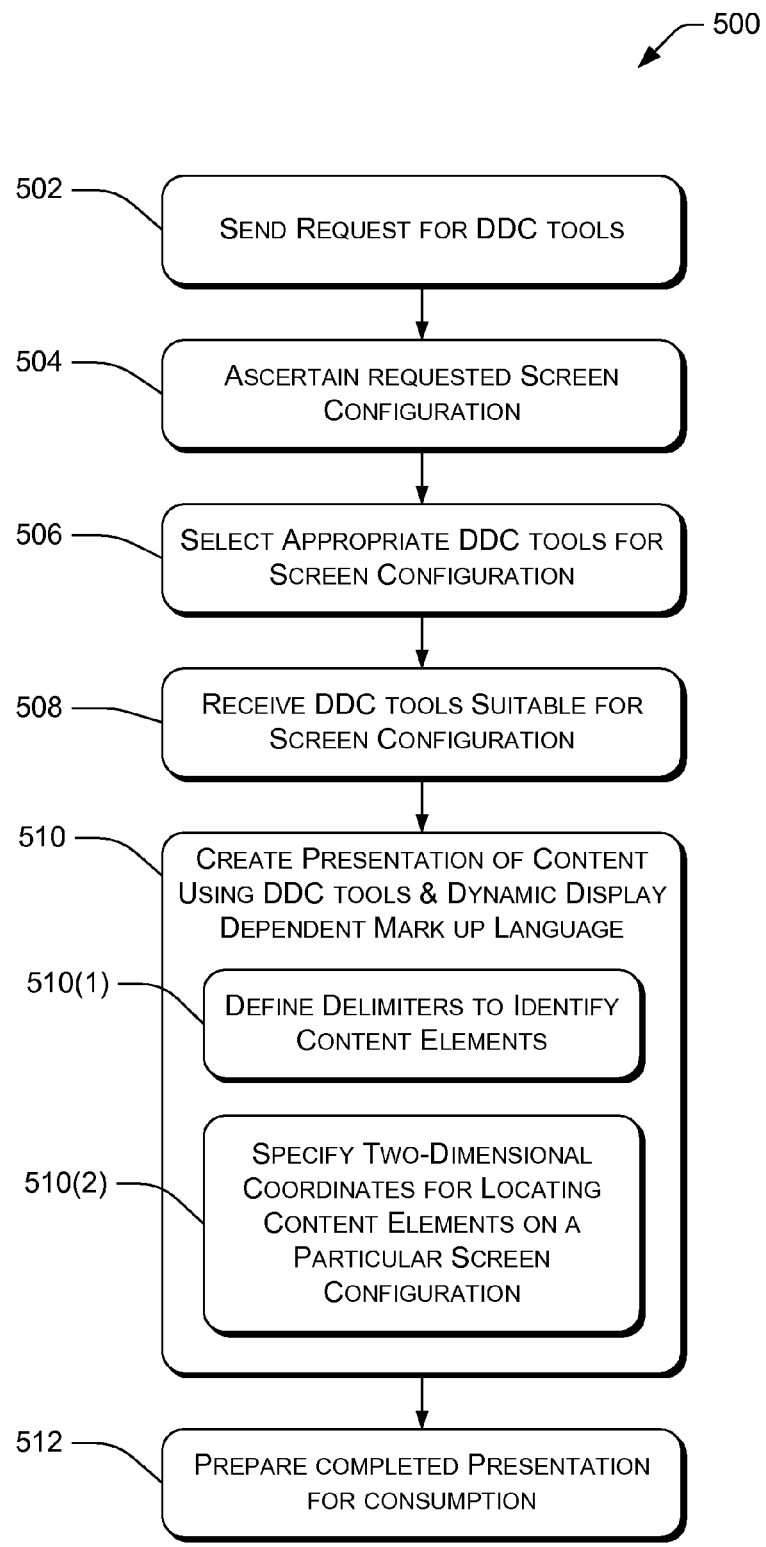
FIG. 5 is a flow diagram of an illustrative process of creating a presentation with a dynamic digital content (DDC) tool(s) utilizing the dynamic display dependent markup language.
Figure 6:
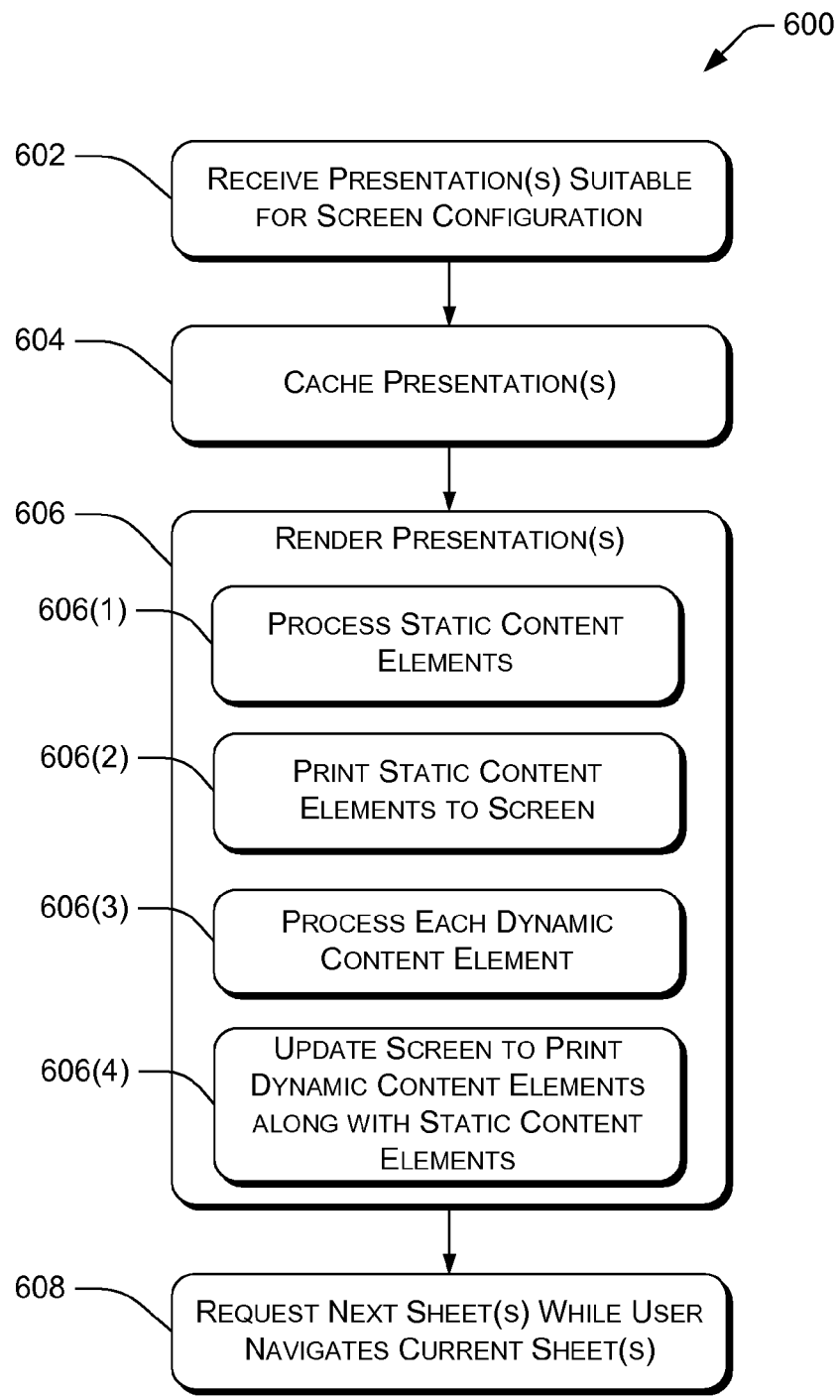
FIG. 6 is a flow diagram of an illustrative process of receiving a presentation created using dynamic digital content (DDC) tool(s) and the dynamic display dependent markup language.

FIGS. 5 and 6 show processes for creating, serving, and rendering pages of content that are created using the DXyml markup language. Each process is illustrated as a collection of referenced acts arranged in a logical flow graph, which represent a sequence that can be implemented in hardware, software, or a combination thereof. In the context of software, the acts represent processor-executable instructions that, when executed by one or more processors, perform the recited operations. Generally, processor-executable instructions include routines, programs, objects, components, data structures, and the like that perform particular functions or implement particular abstract data types. The order in which the acts are described is not intended to be construed as a limitation, and any number of the described acts can be combined in any order and/or in parallel to implement the process. For discussion purposes, the processes are described with reference to the illustrative architecture 100 of FIG. 1, the DXyml source 400 of FIG. 4, and the eBook reader device 102(1) of FIGS. 1, 2, and 7.

FIG. 5 shows a process 500 for creating presentations using DDC tools to access the DXyml markup language and load the presentations on a client with a particular screen configuration, such as eBook reader 102(1). With reference to the architecture 100 in FIG. 1, the process 500 is performed on a client, such as personal computer 102(J). Alternately, the process 500 could be performed on another device 102.

At 502, a request for DDC tools is sent from a requesting client device. With reference to FIG. 1, the servers 108 receive requests from the various client devices 102(1)-102(M). At 504, the screen configuration being requested is ascertained. The servers 108 may determine the screen configuration in many different ways. In one approach, the screen type may be included in the request for DDC tools. In another approach, the server deduces the screen configuration based on the DDC tools being requested. Still another possibility is that one or more of the servers 108 is dedicated to serve DDC tools for only one kind of device, and hence the screen configuration is pre-known as an operating parameter.

At 506, the appropriate DDC tools are selected based on the screen configuration. This may be accomplished by, for example, using the screen configuration as an index parameter for retrieving the appropriate DDC tools ( ) from the API store 120.

At 508, the DDC tools are received by the requesting client device, such as 102(J). In the architecture of FIG. 1, the servers 108 serve the DDC tools over the network 106 to the client devices 102.

At 510, content for presentation is created using a scripting type language and the DDC tools facilitate the particular display layout via the dynamic display dependent markup language. The presentation contains one or more content elements such as text, lines, shapes, and images. In an aspect of at least one implementation, the one or more content elements may be dynamic. The markup language allows the designer to specify locations at which to place the content elements on a display having a particular screen configuration. FIG. 4 shows one representation of DXyml source code 400 for a presentation rendered on the eBook reader of FIG. 3. The presentation creation can be understood as a series of sub-operations that include, at 510(1), defining delimiters to identify the content elements to be presented on the display. In the FIG. 4 example, the delimiters are the symbols "<" and ">". At 510(2), within selected delimiters, coordinate information is specified to locate the content elements within two-dimensional space of the particular screen configuration. In the source 400 of FIG. 4, the coordinate information is specified as x/y coordinates, where an x-coordinate "x=" and a y-coordinate "y=" uniquely locate a pixel in the particular screen configuration. At 512, the completed presentation is prepared for consumption. Additionally, preparing the presentation may cause the presentation to be saved in system or removable memory on the requesting client device. Alternately, preparing the presentation may cause the presentation to be saved in a content store, such as content store 110, and/or preparing the presentation may cause the presentation to be delivered to another client device.

FIG. 6 shows a process 600 for receiving and rendering the content. The process 600 may be performed, for example, by one or more client devices 102. For discussion purposes, the process is described with reference to the eBook reader device 102(1) of FIGS. 1, 2, and 7.

At 602, one or more presentations containing content items, including dynamic content items are received at the client device. The presentation(s) may be received via installation of a removable memory, transferred via a wired or wireless network, such as a network 106, from a peer connection, such as between client personal computer 102(J) and eBook reader device 102(1), and/or downloaded from a server, such as server 108. The presentation(s) is suitable for rendering on a particular screen configuration, such as the display of the eBook reader device 102(1). At 604, the presentation(s) is cached locally at the client device.

Figure 7:
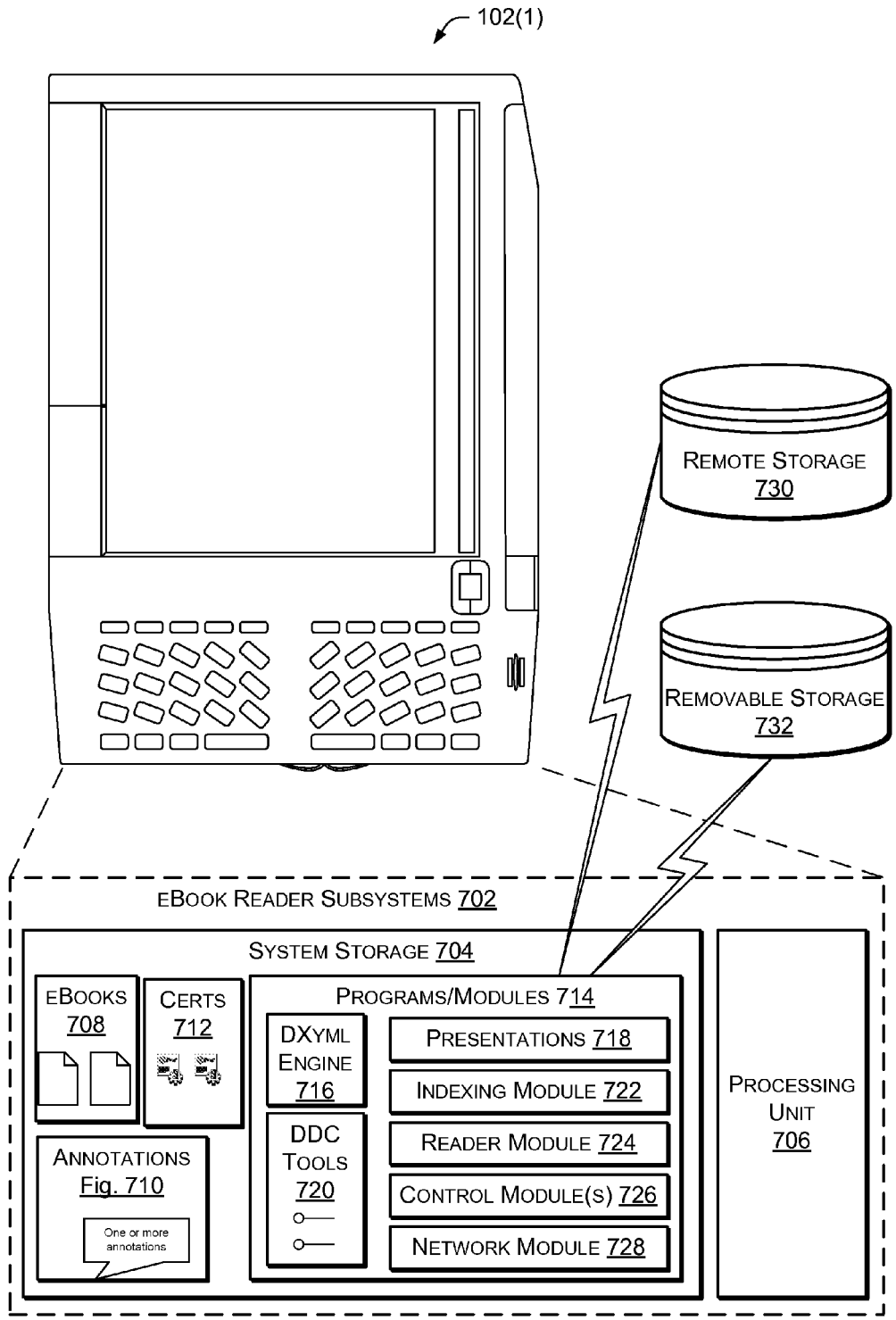
FIG. 7 is an illustrative block diagram showing various components of the eBook reader device of FIG. 2 and FIG. 3.

At 606, the page(s) is rendered. With reference to FIG. 7, the DXyml engine 720 parses the DXyml source 400 (FIG. 4) to render the content items on the display. FIG. 3 shows the page corresponding to the source 400 rendered on the large display 206. The rendering process 606 may be viewed as a series of sub-operations. At 606(1), the DXyml engine 420 processes instructions pertaining to static content elements. Static content elements may include text, graphics, images, etc. At 606(2), the static content elements are printed to the screen. Subsequently, at 606(3), the DXyml engine 720 processes instructions pertaining to dynamic content elements. In one implementation, a separate thread is created for each dynamic content element, retrieving the dynamic content from an appropriate source. In an aspect of at least one implementation, the source is pre-identified, such as an internal or external source which include particular device components, such as illustrated in FIG. 7, (e.g., control module(s) 730), a specialized data store, such as content store 110, or a particular client device such as a particular personal computer 102(J) or PDA 102(M). Alternately, the source may be located utilizing a search engine or via a remote search entity. When one or more dynamic content elements are processed, at 606(4), the screen is updated by printing the dynamic content elements along with the static content elements.

At 608, a new request for a next batch of pages or sheet(s) may be automatically generated and sent by the client device while the user continues to navigate among the multiple pages or sheets in a current batch. For example, suppose that pages 1-5 of an electronic book or article (containing dynamic content elements, or not) have been downloaded to the eBook reader device. When the user advances to page 3 (or some other page that is less than the last page in the cache), the device may automatically initiate a request to fetch the next five pages 6-10 and update any dynamic content elements included in pages 6-10. In this way, any latency of downloading the content to the client device can be masked by pre-fetching additional content based on what the user is likely to request next.

In another alternative, suppose that a sheet presenting the beginning of an interactive game has been presented on the eBook reader device. Upon the beginning sheet's presentation, the device may automatically initiate a request to populate the dynamic content elements of the interactive game. In this way, latency of populating the dynamic content elements on the client device can be masked by pre-loading additional content based on what the user is likely to want next.

In yet another alternative, suppose that dynamic content such as a sports score reporter with dynamic field(s) is presented on the eBook reader device. The dynamic field(s) may include information indicating when the dynamic field should be populated or updated/refreshed (e.g., a time interval and/or upon the occurrence of a particular event).

Illustrative Synchronizing

Applications developed utilizing DDC tools and the DXyml markup language may facilitate code execution from both an inactive and active state. In an aspect of at least one embodiment, when a device is connected to an active network connection (e.g., WAN, LAN, Intranet, Internet), the device may be synchronized to a server although the application may not be running. Additionally, with an active network connection, data may be synchronized to a server although the corresponding dynamic element may not be active. For example, an email client on a device such as an eBook reader device may want to download new emails after the device downloads new newspaper issues. An application may facilitate such synchronization-ability, via specifying a synchronization-file in the configuration file, such as a config.wid file via the DDC tool. Additionally, when the config.wid file contains a synchronization-action property, the value of the config.wid file may be executed as a script.

Regardless of whether the application is running while synchronizing, the only DXyml elements the script can access are xyml (which is still a global singleton) and presentation (which have to be allocated in the script). JavaScript objects (file, path, XMLHttpRequest, DOM objects, etc.) can also be accessed.

Illustrative eBook Device

FIG. 7 illustrates selected components from the eBook reader device 102(1). The eBook reader device has various internal components, which are referred to generally as eBook reader subsystems 702. In one implementation, the subsystems 702 include system storage 704 and a processing unit 706. The processing unit 706 interacts with the system storage 704 to facilitate operation of the eBook reader device 102(1). The system storage 704 may be used to store one or more eBooks 708 (dynamic or otherwise), including eBooks such as news feeds, presentations, and the like. In an aspect of at least one embodiment, eBooks may include dynamic fields and/or present interactive and/or dynamic content such as word games (e.g., word-search and crossword puzzles), number games (e.g., Sudoku and Kakuro), stock-tickers, sports scores, time, temperature, etc. The system storage 704 may also be used to store one or more software programs or other executable modules that may be executed by the processing unit. Examples of such programs or modules may include annotations 710, authentication certificates 712, and other content, as well as software programs or other executable modules 714 which may be executed by the processing unit 706. Examples of such programs or modules 714 include user designed content, downloaded content, and games, any of which may include interactive content such as games (e.g., word games like word-search, crossword puzzles, and Scrabble™), number games (e.g., Sudoku and Kakuro), and other dynamic content, for example stock-tickers, sports scores, time, temperature, etc. Further examples of such programs or modules 714 include a DXyml engine 716 for rendering displays of content created using the DXyml markup language, presentation(s) 718 of digital content created via DDC tools 720 utilizing the DXyml markup language, an indexing module 722 for indexing eBooks, a reader module 724, one or more control modules 726 (e.g., power management), a network connection module 728 to implement an interface to a network (e.g., wireless network), as well as various other modules which are not shown, such as operating models, display drivers, sensor algorithms, page turn detectors, and the like.

The DXyml engine 716 parses the DXyml markup language, such as the source 400 in FIG. 4, to render the content elements on the large display 206. One notable feature of the rendering process is that, due to the nature of the DXyml markup language, the DXyml engine 716 may execute the instructions out of order. It does not need to execute the instructions in order in the way a browser conventionally executes html. For instance, in one implementation, the DXyml engine 716 first renders static elements. Then, the DXyml engine 716 renders all dynamic elements. In one approach, the DXyml engine 716 utilizes one thread per dynamic content element to request the dynamic content element to be downloaded for the presentation. Once all of the dynamic content elements have been retrieved, a presentation update is performed to present all of the dynamic content elements on the display at the same time, thereby adding the dynamic content element to the static elements already on the display.

In addition to the system storage 704, the eBook reader device 102(1) may have access to one or more sources of remote storage 730 over a network or on a peer-to-peer basis. The sources of remote storage 730 may be accessible using the network connection module 728, for example, and may be in communication via a wired or wireless connection. The remote storage 730 may include a personal computer, another eBook reader, or any other suitable remote storage device. Moreover, the eBook reader device 102(1) may receive content via one or more types of removable storage 732.

The system storage 704 and remote storage 730 may include volatile memory (such as RAM), nonvolatile memory, removable memory, and/or non-removable memory, implemented in any method or technology for storage of information. System storage 704, remote storage 730, and removable storage 732 may be implemented in any method or technology for storage of information such as computer-readable instructions, data structures, program modules, or other data. Also, the processing unit 706 may include onboard memory in addition to or instead of the system storage 704. Some examples of storage media which may be included in the system storage 704, remote storage 730 and/or removable storage 732 include, but are not limited to, RAM, ROM, EEPROM, memory cards, such as SecureDigital (SD) cards, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the eBook reader device 102 (1). Any such computer storage media may be part of the eBook reader device 102(1).

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various implementations. An implementation of these modules and techniques may be stored on or transmitted across some form of computer-readable media.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims

What is claimed is:

1. A method comprising:
issuing a dynamic xyml call by a client process to a host process, the dynamic xyml call having a plurality of call parameters comprising a global singleton and an xyml named document, the dynamic xyml call being configured to cause the host process to parse the call and to retrieve the parameters; and
receiving, by the client process, a dynamic xyml acknowledgment having a plurality of acknowledgment parameters comprising the global singleton and the xyml document comprising at least one of a plurality of handlers, wherein:
a predetermined trigger will cause a script corresponding to a handler associated with the predetermined trigger to execute; and
the plurality of handlers are contained by xyml elements and sheets such that:
at least one of the plurality of handlers is a child element of an xyml element;
at least one of the plurality of handlers is a child element of a sheet and becomes active when the sheet is visible; and
handlers that are child elements of sheets override handlers that are child elements of xyml elements.

2. A method as recited in claim 1, wherein the parameters comprise an active sheet identifier, and setting the active sheet identifier renders a previous visible sheet invisible and triggers a handler corresponding to the previous visible sheet.

3. A method as recited in claim 1, wherein the issuing by the client process further comprises an xyml call comprising a call to exit a current application and open an electronic commerce application.

4. A method as recited in claim 1, wherein the dynamic xyml call comprises a parse xml call causing an application to parse an xml representation of DXyml elements and return an array of elements.

5. One or more storage media having computer-executable instructions encoded thereon, the computer-executable instructions upon execution configuring a device to perform operations comprising:
issuing a dynamic xyml call by a client process to a host process, the dynamic xyml call having a plurality of call parameters comprising a global singleton and an xyml named document, the dynamic xyml call being configured to cause the host process to parse the call and to retrieve the parameters;
receiving, by the client process, a dynamic xyml acknowledgment having a plurality of acknowledgment parameters comprising the global singleton and the xyml document comprising at least one of a plurality of handlers, wherein a predetermined trigger will cause a script corresponding to a handler associated with the predetermined trigger to execute; and
wherein the parameters further comprise an active sheet identifier, and setting the active sheet identifier renders a previous visible sheet invisible and triggers a handler corresponding to the previous visible sheet.

6. One or more storage media as recited in claim 5, wherein handlers are contained by xyml elements and sheets such that:
at least one of a plurality of handlers is a child element of an xyml element;

at least one of a plurality of handlers is a child element of a sheet and becomes active when the sheet is visible; and handlers that are child elements of sheets override handlers that are child elements of xyml elements.

7. One or more storage media as recited in claim 5, wherein the issuing by the client process further comprises an xyml call comprising a call to exit a current application and open an electronic commerce application.

8. One or more storage media as recited in claim 5, wherein the dynamic xyml call comprises a parse xml call causing an application to parse an xml representation of DXyml elements and return an array of elements.

9. One or more storage media as recited in claim 5, wherein a sheet as identified by the active sheet identifier includes a collection of content for presentation at a same time according to dynamic XML-based markup instructions that specify an x-coordinate and a y-coordinate of at least one dynamic content element for placement on the sheet.

10. A device comprising:
a processor;
a storage media having computer-executable instructions encoded thereon, the computer-executable instructions upon execution by the processor configuring the device to perform operations comprising:
issuing a dynamic xyml call by a client process to a host process, the dynamic xyml call having a plurality of call parameters comprising a global singleton and an xyml named document, the dynamic xyml call being configured to cause the host process to parse the call and to retrieve the parameters;
receiving, by the client process, a dynamic xyml acknowledgment having a plurality of acknowledgment parameters comprising the global singleton and the xyml document comprising at least one of a plurality of handlers, wherein a predetermined trigger will cause a script corresponding to a handler associated with the predetermined trigger to execute; and
wherein the issuing by the client process further comprises an xyml call comprising a call to exit a current application and open an electronic commerce application.

11. A device as recited in claim 10, wherein handlers are contained by xyml elements and sheets such that:
at least one of a plurality of handlers is a child element of an xyml element;
at least one of a plurality of handlers is a child element of a sheet and becomes active when the sheet is visible; and
handlers that are child elements of sheets override handlers that are child elements of xyml elements.

12. A device as recited in claim 10, wherein the parameters comprise an active sheet identifier, and setting the active sheet identifier renders a previous visible sheet invisible and triggers a handler corresponding to the previous visible sheet.

13. A device as recited in claim 12, wherein a sheet as identified by the active sheet identifier includes a collection of content for presentation at a same time according to dynamic XML-based markup instructions that specify an x-coordinate and a y-coordinate of at least one dynamic content element for placement on the sheet.

14. A device as recited in claim 10, wherein the dynamic xyml call comprises a parse xml call causing an application to parse an xml representation of DXyml elements and return an array of elements.

15. A method comprising:
issuing a dynamic xyml call by a client process to a host process, the dynamic xyml call having a plurality of call parameters comprising a global singleton and an xyml named document, the dynamic xyml call being configured to cause the host process to parse the call and to retrieve the parameters;
receiving, by the client process, a dynamic xyml acknowledgment having a plurality of acknowledgment parameters comprising the global singleton and the xyml document comprising at least one of a plurality of handlers, wherein a predetermined trigger will cause a script corresponding to a handler associated with the predetermined trigger to execute; and
wherein the parameters further comprise an active sheet identifier, and setting the active sheet identifier renders a previous visible sheet invisible and triggers a handler corresponding to the previous visible sheet.

16. A method as recited in claim 15, wherein handlers are contained by xyml elements and sheets such that:
at least one of a plurality of handlers is a child element of an xyml element;
at least one of a plurality of handlers is a child element of a sheet and becomes active when the sheet is visible; and
handlers that are child elements of sheets override handlers that are child elements of xyml elements.

17. A method as recited in claim 15, wherein the issuing by the client process further comprises an xyml call comprising a call to exit a current application and open an electronic commerce application.

18. A method as recited in claim 15, wherein the dynamic xyml call comprises a parse xml call causing an application to parse an xml representation of DXyml elements and return an array of elements.

19. A method as recited in claim 15, wherein a sheet as identified by the active sheet identifier includes a collection of content for presentation at a same time according to dynamic XML-based markup instructions that specify an x-coordinate and a y-coordinate of at least one dynamic content element for placement on the sheet.

20. A method comprising:
issuing a dynamic xyml call by a client process to a host process, the dynamic xyml call having a plurality of call parameters comprising a global singleton and an xyml named document, the dynamic xyml call being configured to cause the host process to parse the call and to retrieve the parameters;
receiving, by the client process, a dynamic xyml acknowledgment having a plurality of acknowledgment parameters comprising the global singleton and the xyml document comprising at least one of a plurality of handlers, wherein a predetermined trigger will cause a script corresponding to a handler associated with the predetermined trigger to execute; and
wherein the issuing by the client process further comprises an xyml call comprising a call to exit a current application and open an electronic commerce application.

21. A method as recited in claim 20, wherein handlers are contained by xyml elements and sheets such that:
at least one of a plurality of handlers is a child element of an xyml element;
at least one of a plurality of handlers is a child element of a sheet and becomes active when the sheet is visible; and
handlers that are child elements of sheets override handlers that are child elements of xyml elements.

* * * * *